United States Patent [19]

Ohsawa

[11] Patent Number: 5,477,411
[45] Date of Patent: Dec. 19, 1995

[54] PULSE MOTOR CONTROL DEVICE

[75] Inventor: Hiroshi Ohsawa, Saitama, Japan

[73] Assignee: Zexel Corporation, Tokyo, Japan

[21] Appl. No.: 353,307

[22] Filed: Dec. 5, 1994

[30] Foreign Application Priority Data

Dec. 24, 1993 [JP] Japan .................................. 5-347621

[51] Int. Cl.⁶ .................................................. H02H 7/09
[52] U.S. Cl. ................ 361/33; 361/84; 361/86; 361/92
[58] Field of Search .................. 361/23, 33, 86, 361/84, 92; 318/101, 815

[56] References Cited

U.S. PATENT DOCUMENTS

| | | | |
|---|---|---|---|
| 4,633,358 | 12/1986 | Nagano | 361/33 |
| 4,772,977 | 9/1988 | Bottrell et al. | 361/33 |
| 5,306,990 | 4/1994 | Hofsaee et al. | 361/33 |

*Primary Examiner*—Todd DeBoer

[57] ABSTRACT

A pulse motor control device comprises, as additional component parts, a power-off detecting circuit, and a turning-off circuit. The power-off detecting circuit detects, when a driving switch is turned off, a dropping of a voltage supplied to a driving circuit and outputs a power-off detection signal. The turning-off circuit includes diodes and a control resistor. The diodes are connected respectively to control terminals of all driving transistors of the driving circuit. When the control transistor is turned on in response to the power-off detection signal, voltages of control terminals of the driving transistors are dropped to the ground level through the diodes, thereby turning off the driving transistors.

4 Claims, 2 Drawing Sheets

PULSE MOTOR CONTROL DEVICE

BACKGROUND OF THE INVENTION

The present invention relates to a device for controlling a pulse motor, and more particularly to an improvement of its control when a driving switch is turned off.

A pulse motor, as one type of a brushless motor, is used in various fields such as in the field of air conditioning devices.

As illustrated in FIG. 2, a typical conventional device for controlling a pulse motor comprises a power source $V_B$, a power source circuit 1, a control circuit 2, a driving circuit 3, and a driving switch SW. A power supply line V1 is connected to one end of the power source $V_B$, and a ground line V0 is connected to the other end thereof. The driving switch SW is connected to the power supply line V1. The power source circuit 1 and the driving circuit 3 are connected to the power source $V_B$ via the driving switch SW.

The power source circuit 1 includes a constant voltage generating circuit 11, a reverse connection preventive diode D, and a noise absorbing electrolytic capacitor C. When the driving switch SW is in the ON-state, the constant voltage generating circuit 11 receives, via the driving switch SW and diode D, an electric power from the power source $V_B$ and supplies a constant voltage to the control circuit 2. One pole, i.e., positive pole, of the electrolytic capacitor C, is connected to between the constant voltage generating circuit 11 and the diode D, while the other pole, i.e., negative pole, is connected to the ground line V0.

The driving circuit 3 includes six (6) MOS type FET 31 to FET 36 (switching elements) for controlling the supply of electric current to driving coils L1, L2 and L3 of a stator of the pulse motor. Drains of the FET 31 to FET 33 are connected to the power supply line V1, and sources of the FET 34 to FET 36 are connected to the Ground line V0. A source of the FET 31 and a drain of the FET 34 are connected to each other, a source of the FET 32 and a drain of the FET 35 are connected to each other, and a source of the FET 33 and a drain of the FET 36 are connected to each other. Gates of the FET 31 to FET 36 receive high level control signals from output terminals of the control circuit 2, respectively and are turned on in response to the control signals thus received. The FET 31 to FET 36 respectively include parasitic diodes, i.e., built-in diodes D1 to D6, which are interposed between the sources and the drains. Cathodes of the built-in diodes D1, D2 and D3 are connected to the power supply line V1. Anodes of the built-in diodes D4, D5 and D6 are connected to the Ground line V0. One end of the driving coil L1 is connected to between the FET 31 and FET 34, while the other end thereof is connected to between the FET 32 and FET 35. One end of the driving coil L2 is connected to between the FET 32 and FET 35, while the other end is connected to between the FET 33 and FET 36. One end of the driving coil 3 is connected to between the FET 31 and 34, while the other end is connected to between the FET 33 and 36.

With the above-mentioned construction, when the driving switch SW is turned on, a constant voltage from the power source circuit 1 is supplied to the control circuit 2, thereby activating the control circuit 2. In response to a detection pulse coming from a sensor (not shown) for detecting the rotation of a rotor of the pulse motor, the control circuit 2 outputs a high level control signal so that a pair of FET are selectively turned On one by one. When the FET 31 and FET 35 are simultaneously turned on by outputting control signals A1 and A5, an electric current flows through the driving coil L1 in a direction as shown by an arrow in FIG. 2, thus generating a force for attracting the rotor. Similarly, when the FET 32 and FET 34 are simultaneously turned on by outputting control signals A2 and A4, an electric current flows through the driving coil L1 but in an opposite direction to the direction as shown by the arrow, thus generating a force for repulsing the rotor.

When the FET 32 and 36 are simultaneously turned on by outputting the control signals A2 and A6, an electric current flows through the driving coil L2 in a direction as shown by an arrow in FIG. 2. When the FET 33 and FET 35 are simultaneously turned on by outputting control signals A3 and A5, an electric current flows through the driving coil L2 but in an opposite direction to the direction as shown by the arrow.

When the FET 31 and 36 are simultaneously turned on by outputting the control signals A1 and A6, an electric current flows through the driving coil L3 in a direction as shown by an arrow in FIG. 2. When the FET 33 and FET 34 are simultaneously turned on by outputting control signals A3 and A4, an electric current flows through the driving coil L3 but in an opposite direction to the direction as shown by the arrow.

As described above, the FET pairs thus turned on have six (6) combinations. By selecting the combinations in a known order, a rotational magnetic field is generated in the stator of the pulse motor and the rotor of the pulse motor is rotated in a predetermined direction. The rotation of the pulse motor is stopped by turning off the driving switch SW.

The control device having the above-mentioned construction has the following drawbacks. Since no electric current is supplied to the driving coils L1 to L3 from the power source $V_B$, the rotor is rotated merely by inertia. A braking current is supplied to the driving coils L1 to L3, and a magnetic field is generated in the driving coils L1 to L3. As a result, the rotor is abruptly stopped. A stopping sound (so-called "shaking noise") is generated at the time. This makes it impossible to fully enjoy one of the important advantages, i.e., low noise, of the pulse motor.

The present inventor has guessed or anticipated a possible cause of generation of a braking current as follows. Even if the driving switch SW is turned off, the control circuit 2 is kept operated until after the completion of discharge, by electric charge which has been accumulated within the electrolytic capacitor C in the power source circuit 1, and closed circuits including one of the driving coils L1 to L3 are formed one after another. For example, when the FET 32 is in the ON-state in FIG. 2, a closed circuit is formed by the FET 32 which is in the ON-state, the driving coil L2 and the built-in diode D3 of the FET 33. As a consequence, when a permanent magnet of the rotor is moved across the driving coil in the closed circuit, a braking current B1 is generated in the driving coil L2.

SUMMARY OF THE INVENTION

It is, therefore, an object of the present invention to provide a pulse motor control device, in which generation of a braking current is eliminated when the operation of a pulse motor is stopped, thereby preventing abrupt stop of rotation of the pulse motor caused by the braking current and thus facilitating the realization of a lower noise.

According to the present invention, there is provided a pulse motor control device comprising:

(a) a driving circuit connected to a power supply line extending from a power source and having a plurality of switching elements for controlling the supply of electric current to a plurality of driving coils of a pulse motor;

(b) a power source circuit connected to the power supply line and adapted to generate a constant voltage;

(c) a control circuit which is activated upon receipt of the constant voltage from the power source circuit, the control circuit sending control signals respectively to the switching elements so that the switching elements are turned on, thereby energizing the driving coil in accordance with a predetermined sequential order;

(d) a driving switch disposed on the power supply line, the driving circuit and the power source circuit being connected to the power source through the driving switch;

(e) power-off detection means for detecting that voltage supplied to the driving circuit is lowered when the driving switch is turned off and outputting a power-off detection signal; and (f) turning-off means for forcibly turning off all the switching elements of the driving circuit in response to the power-off detection signal.

DETAILED DESCRIPTION OF THE EMBODIMENT

Figure 1:
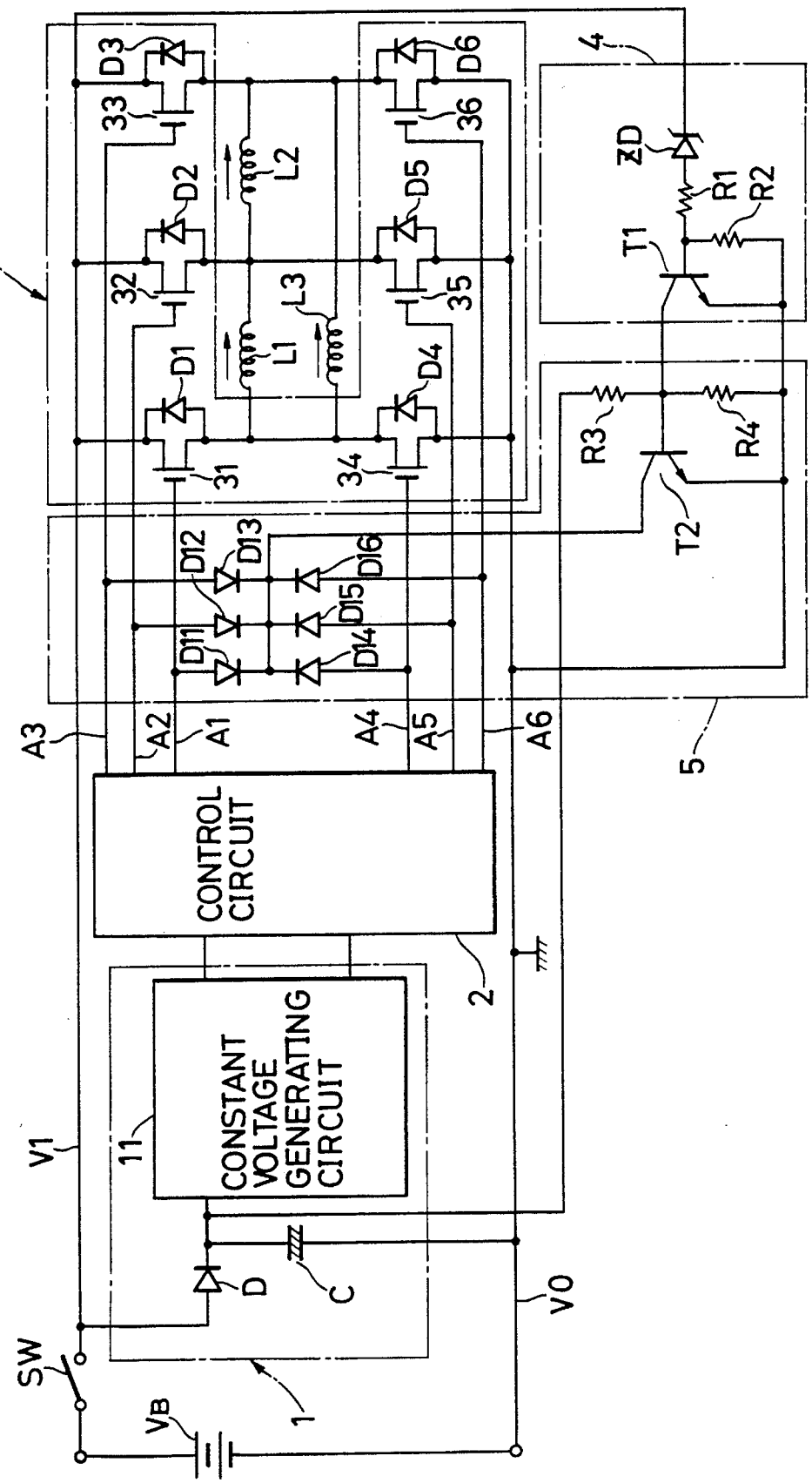
FIG. 1 is a circuit diagram of a pulse motor control device according to the present invention.

One embodiment of a pulse motor control device according to the present invention will now be described with reference to FIG. 1. In FIG. 1, a brief statement will be made with respect to a common construction part with the prior art device of FIG. 2, and the remaining construction (namely, newly added construction) part will be described in detail.

Figure 2:
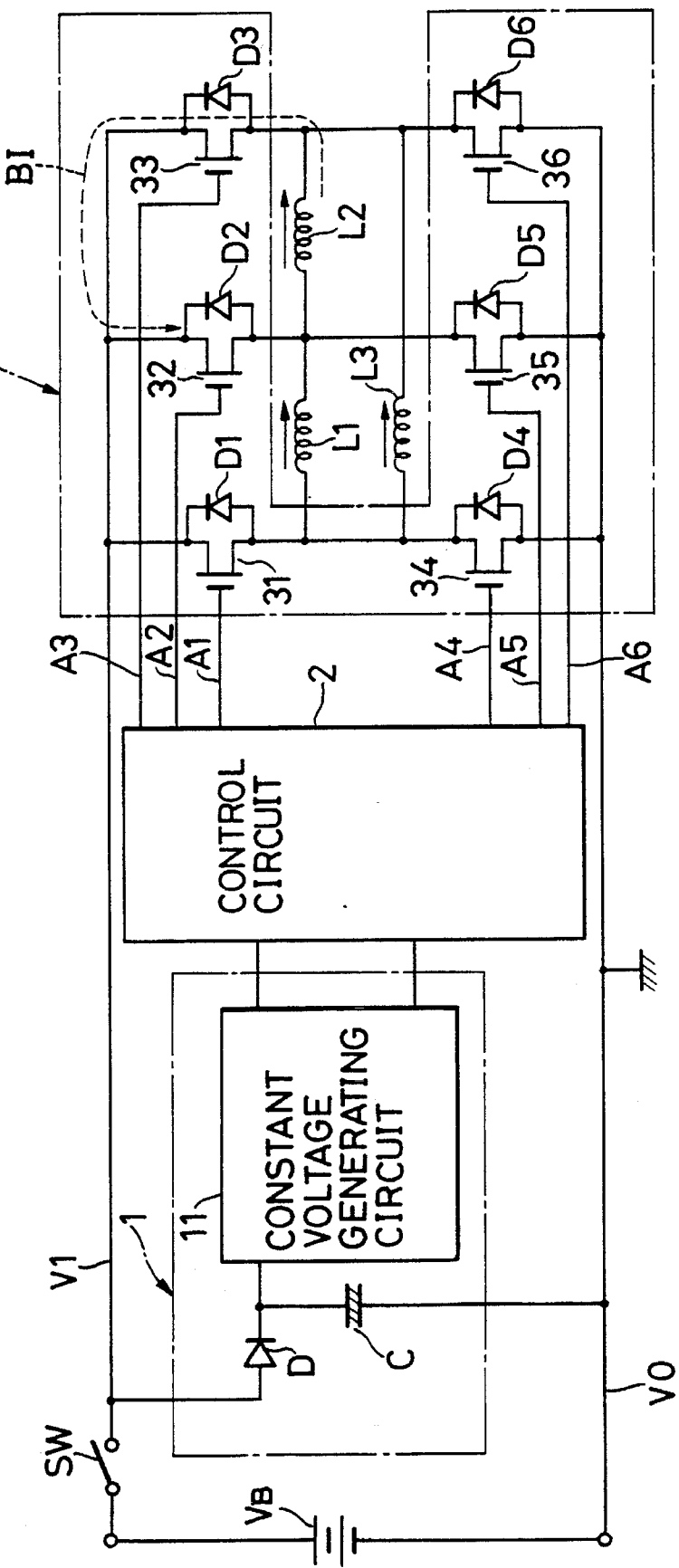
FIG. 2 is a circuit diagram showing a conventional pulse motor control device.

The control device, as in the case with the prior art device of FIG. 2, comprises a power source $V_B$, a power source circuit 1, a control circuit 2, a driving circuit 3, and a driving switch SW. The power source circuit 1 includes a constant voltage generating circuit 11, a reverse connection preventive diode D, and an electrolytic capacitor C. The driving circuit 3 includes six (6) MOS type FET 31 to FET 36 (driving transistors) for controlling the supply of electric current to driving coils L1, L2 and L3 of a stator of a pulse motor. The FET 31 to FET 36 respectively include parasitic diodes, i.e., built-in diodes D1 to D6, which are interposed between the sources and the drains.

The device of the present invention additionally comprises a power-off detection circuit 4, and a turning-off circuit 5.

The power-off detection circuit 4 includes an emitter-grounded first transistor T1 (detection transistor), a Zener diode ZD, and two (2) resistors R1 and R2. The Zener diodes D and the resistors R1 and R2 are connected in serial relation to a ground line V0 from a power supply line V1 in this order. A voltage at a connecting point between the resistors R1 and R2 is supplied to a base of the first transistor T1.

The turning-off circuit 5 includes an emitter-grounded second transistor T2 (control transistor), two (2) resistors R3 and R4, and six (6) diodes D11 to D16. The resistors R3 and R4 are in serial relation to each other and interposed between a positive pole of the electrolytic capacitor C and the ground line V0. A connecting point between the resistors R3 and R4 is connected to a collector of the first transistor T1 and also to a base of the second transistor T2. Anodes of the diodes D11 to D16 are connected respectively to gates of the FET 31 to FET 36, while cathodes thereof are connected to a collector of the second transistor T2.

With the above-mentioned construction, when the driving switch SW is turned on, a voltage from the power source $V_B$ is supplied to the power source circuit 1 and a constant voltage from this power source circuit 1 is supplied to the control circuit 2. At the same time, a power source voltage is also supplied to the driving circuit 3. As a consequence, the pulse motor is rotated as previously mentioned. During the driving state of the pulse motor, a constant electric current flows through the Zener diode ZD of the power-off detection circuit 4 and through the serial circuit of the resistors R1 and R2, and the voltage at the connecting point between the resistors R1 and R2 maintains a constant level. As a result, the first transistor T1 is held in the ON-state. Owing to this, the voltage of the base of the second transistor T2 is brought equal to the ground level, and thus the second transistor T2 is brought to be in the OFF-state. Because the second transistor T2 is in the OFF-state, the respective diodes D11 to D16 are in the OFF-states. As a consequence, the pulse motor can be controllably rotated by the control signals A1 to A6 outputted from the control circuit 2.

When the driving switch SW is turned off to stop the supply of voltage to the driving circuit 3 in order to stop the driving of the pulse motor, no electric current flows through the serial circuit of the Zener diode ZD and resistors R1 and R2. As a result, the voltage of the base of the first transistor T1 is brought equal to the ground level thereby turning off the first transistor T1 (outputting of a power-off detection signal). By this, the base of the second transistor T2 receives a voltage obtained by dividing the voltage of the electrolytic capacitor C by those of the resistors R3 and R4, and thus the second transistor T2 is turned on. As a consequence, the diodes D11 to D16 are all turned on and the voltages of the gates of the six (6) FET 31 to FET 36 are brought equal to the ground level. Therefore, the FET 31 to FET 36 are all forcibly turned off.

In this way, since the six (6) FET 31 to FET 36 are all turned off when the driving switch SW is turned off, a formation of a closed circuit including any one of the driving coils L1 to L3 can be prevented. As a consequence, generation of a braking current, which would otherwise be generated in accordance with the inertial rotation of the pulse motor, can be prevented. Since the pulse motor, which has been rotated by inertia, is stopped gradually, generation of a noise (shaking noise) occurrable by abrupt stop of the pulse motor can be prevented effectively.

What is claimed is:

1. A pulse motor control device comprising:

(a) a driving circuit connected to a power supply line extending from a power source and having a plurality of switching elements for controlling the supply of electric current to a plurality of driving coils of a pulse motor;

(b) a power source circuit connected to said power supply line and adapted to generate a constant voltage;

(c) a control circuit which is activated upon receipt of the constant voltage from said power source circuit, said control circuit sending control signals respectively to said switching elements so that said switching elements are turned on, thereby energizing said driving coil in accordance with a predetermined sequential order;

(d) a driving switch disposed on said power supply line, said driving circuit and said power source circuit being connected to said power source through said driving switch;

(e) power-off detection means for detecting that voltage supplied to said driving circuit is lowered when said driving switch is turned off and outputting a power-off detection signal; and (f) turning-off means for forcibly turning off all said switching elements of said driving circuit in response to the power-off detection signal.

2. A pulse motor control device according to claim 1, in which opposite ends of each of said driving coils are connected to said power supply line respectively through two driving transistors which act as said switching elements, and said opposite ends are also connected to the ground respectively through other two driving transistors which also act as said switching elements, said driving transistors being turned on when control terminals thereof receive said control signals of high level from said control circuit, and in which said turning-off means includes a plurality of diodes and a control trasistor, said diodes having anodes which are connected respectively to said control terminals of said driving transistors, said control transistors being interposed between cathodes of said diodes and the ground, said control transistor being turned on in response to said power-off detection signal, thereby dropping said control terminals of said driving transistors equal to the ground level through said diodes.

3. A pulse motor control device according to claim 2, in which said power-off detection means includes a detection transistor connected to between a control terminal of said control transistor of said turning-off means and the ground, and a plurality of resistors interposed in serial relation between said power supply line and the ground, a voltage at a connecting point between said resistors being supplied to said control terminal of said detection transistor, said detection transistor being turned on when said driving switch is in the ON-state, thereby maintaining said control transistor of said turning-off means in the OFF-state, said detection transistor being turned off because the voltage at said connecting point is brought equal to the ground level when said driving switch is turned off, thereby turning on said control transistor.

4. A pulse motor control device according to claim 3, in which said power source circuit comprises a constant voltage generating circuit, and a capacitor whose positive pole is connected to said constant voltage generating circuit and said power supply line, a plurality of other resistors being interposed in serial relation between the positive pole of said capacitor and the ground, a voltage at a connecting point between said other resistors being supplied to said control terminal of said control transistor.

\* \* \* \* \*